United States Patent
Gadou et al.

(10) Patent No.: US 11,989,684 B2
(45) Date of Patent: May 21, 2024

(54) CAMERA-IMPLEMENTED ARTICLE LAYOUT CONTROL METHOD FOR SHELVES EQUIPPED WITH ELECTRONIC SHELF LABELS

(71) Applicant: SES-imagotag, Nanterre (FR)

(72) Inventors: Thierry Gadou, Paris (FR); François Robin, Paris (FR); Andreas Rössl, Voitsberg (AT); Thomas Schwarz, Hohberg (DE)

(73) Assignee: VusionGroup (FR)

( * ) Notice: Subject to any disclaimer, the term of this patent is extended or adjusted under 35 U.S.C. 154(b) by 0 days.

(21) Appl. No.: 16/648,120

(22) PCT Filed: Sep. 18, 2018

(86) PCT No.: PCT/EP2018/075221
§ 371 (c)(1),
(2) Date: Mar. 17, 2020

(87) PCT Pub. No.: WO2019/057716
PCT Pub. Date: Mar. 28, 2019

(65) Prior Publication Data
US 2020/0234227 A1 Jul. 23, 2020

(30) Foreign Application Priority Data
Sep. 19, 2017 (FR) ...................... 1758650

(51) Int. Cl.
*G06Q 10/087* (2023.01)
*G06F 16/583* (2019.01)

(52) U.S. Cl.
CPC ......... *G06Q 10/087* (2013.01); *G06F 16/583* (2019.01)

(58) Field of Classification Search
None
See application file for complete search history.

(56) References Cited

U.S. PATENT DOCUMENTS

2016/0171429 A1* 6/2016 Schwartz .................. G06T 7/10
382/103
2016/0188634 A1 6/2016 Geva et al.
(Continued)

FOREIGN PATENT DOCUMENTS

JP 2011096039 A * 5/2011
JP 2017-162375 A 9/2017
(Continued)

OTHER PUBLICATIONS

French Search Report for Application No. FR 1758650 dated Apr. 10, 2018, 1 page.
(Continued)

*Primary Examiner* — Ariel J Yu
(74) *Attorney, Agent, or Firm* — Lerner David LLP

(57) ABSTRACT

In a sales area, a method for checking the layout of articles in a gondola, the gondola comprising at least one electronic shelf label which corresponds to a matching area of a gondola, with a single product slot field comprising a gondola number, a row number and a shelf label number, the method comprising steps of: acquisition of an image of the gondola; automated detection of electronic shelf labels, and automated detection of rows; for at least one electronic shelf label, determination of the matching area of the gondola, and determination of the slot field; detection of layout information in said area of the gondola in the acquired image; identification of the associated article identifier in a realogram database; and check of compliance of detected layout information, with respect to expected layout information stored in the realogram database.

14 Claims, 13 Drawing Sheets

(56) References Cited

U.S. PATENT DOCUMENTS

2016/0379367 A1* 12/2016 Yasunaga ............... G06V 20/52
                                                            382/103
2017/0032311 A1*  2/2017 Rizzolo ................. G06V 20/10
2019/0019285 A1   1/2019 Matsumoto et al.
2019/0311489 A1* 10/2019 Lam ......................... G06T 7/73

FOREIGN PATENT DOCUMENTS

KR     2011-0000789 A      1/2011
WO     WO-2017083424 A1 *  5/2017   ......... G06K 9/00771

OTHER PUBLICATIONS

International Search Report from Application No. PCT/EP2018/075221 dated Nov. 20, 2018, 1 page.

* cited by examiner

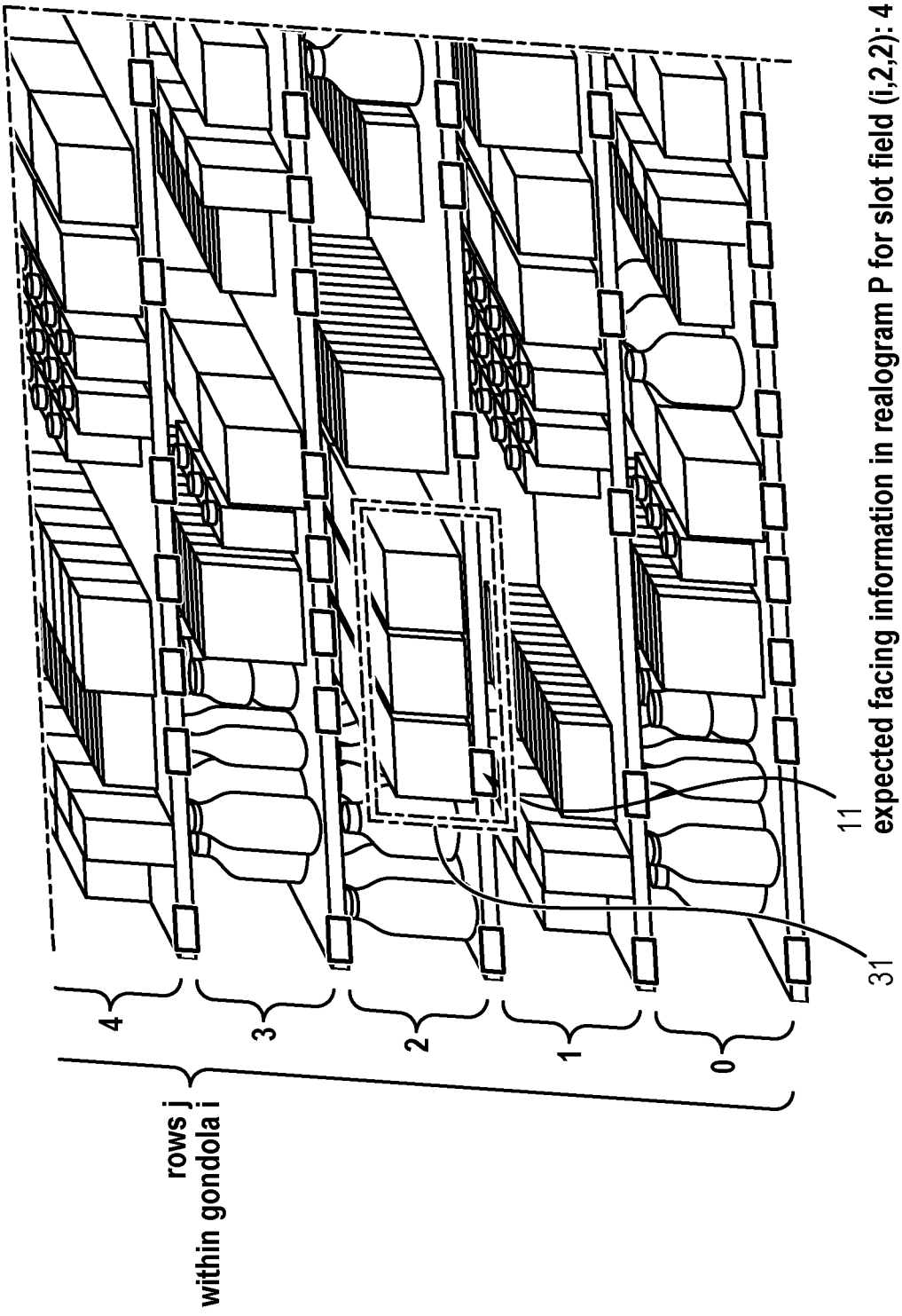

CAMERA-IMPLEMENTED ARTICLE LAYOUT CONTROL METHOD FOR SHELVES EQUIPPED WITH ELECTRONIC SHELF LABELS

CROSS-REFERENCE TO RELATED APPLICATIONS

The present application is a national phase entry under 35 U.S.C § 371 of International Application No. PCT/EP2018/075221 filed Sep. 18, 2018, which claims priority from French Application No. 1758650 filed Sep. 19, 2017, all of which are hereby incorporated herein by reference.

TECHNICAL FIELD OF THE INVENTION

The invention pertains to the field of management of the layout of articles on sale in a sales area.

PRIOR ART

Shelves of a salespoint are generally organized in gondolas, with articles on sale being disposed on several rows for each gondola.

In general, shelves also comprise shelf labels which are disposed along the exterior edge of a shelf, which can preferentially be electronic shelf labels, for displaying information related to an article offered for sale, such as price, price per weight, name of the article, etc.

In the particular case of electronic shelf labels (referred to below as ESLs), the information displayed on the screen of one ESL is remotely controlled by radiofrequency, be it low frequency or high frequency. Displayed information for each article on sale can be updated in real-time, in compliance with updates of a central file of a database, contained for instance in a labels database. In the central file, each article on sale, identified by a unique article identifier, is associated with several data such as price, name, price per weight . . . which can be continually updated so that all ESLs display the relevant and up-to-date information contained in the central file. The link between a particular electronic shelf label and the corresponding article is typically identified by an association, in the central file, between a label identifier which is unique and particular to each ESL, and an article identifier. In practice, an article on sale is located in a predetermined area in the shelves, typically immediately below or above the corresponding ESL. In all the following, we will refer to the area of the shelf which corresponds to a given ESL as a "matching area" with said ESL. For an ESL displaying article information related to an article, the corresponding matching area contains one or more items of said article, arranged in one or more lines within said area of the shelf. The number of lines shown for said article is a part of the "facing information" for said article in the salespoint.

In this manner, customers of a salespoint are always provided valid information, in conformity with legal requirements. The information that is effectively used at the cash-out for payment of bought items is retrieved from the same central file, such that mismatches between the information displayed by the ESLs on the shelves when the customers make their choice, and information used at the moment of payment, is avoided. Besides, in a salespoint wherein shelves are equipped with ESLs, changes to the product information in the central file are automatically and very quickly translated into the information displayed to consumers on the shelves, whereas non-electronic shelf labels would have to be manually changed individually.

The layout of articles in the salespoint can be represented in a planogram database of the salespoint. A planogram database contains links between identifiers of articles on sale and areas of shelves of the salespoint, which are intended to contain said articles. Such a planogram database typically takes the form of a correlation table matching article identifiers, for instance EAN numbers, with identifiers of locations (such as areas of the shelves) within the salespoint. The planogram database is usually extended by a visual planogram, that is, a two-dimensional or three-dimensional visual representation of the setup of the shelves, wherein articles can be visually recognized by an expected front side of the items visible by the customer while facing the shelves, called "front view".

However, in the standard case, a planogram database, and a corresponding visual planogram, are created for a salespoint when said salespoint opens, sometimes according to a generic model which is not necessarily adapted to the salespoint. It can especially be a model corresponding to the size of the store. The assignment of areas of the shelves to particular products can eventually change, after the planogram database has been initialized. In recent years, there has been an effort to create "realograms", i.e. planograms which take into account changes made to the assignment of shelf spaces, or changes made to the assignment of shelf labels. In the typical case of a salespoint equipped with electronic shelf labels, a "realogram database" is updated whenever an ESL is re-assigned to a different product. The realogram database is therefore a reliable and up-to-date representation of the reality of the shelves (in the case in which all articles are adequately stocked in the shelves, and with the expected facing). There is no discrepancy between the realogram database and the real shelving of the salespoint.

In order to maintain a reliable realogram database, it is highly preferable to use electronic shelf labels, as opposed to mere paper shelf labels. Indeed, electronic shelf labels allow not only for automatic updates of article information in compliance with a central file of the salespoint, but they also allow to reflect in the realogram database any changes made to the associations between shelf labels and article identifiers. In addition, ESLs are generally held fixed at a specific location in a shelf which cannot be changed, unless intended by the personnel of the salespoint. Thus, when a given ESL is re-affected to a different product, this re-assignment of the shelf label can be impacted in the information present in the realogram database for the area of the shelf corresponding to said shelf label.

The provision of a reliable and complete realogram database allows development of applications for geolocation of articles within the salespoint, which can be directed to both customers of the salespoint, or employees of the salespoint. In both cases, having up-to-date layout information about articles (such as whether the corresponding areas of the shelf are empty or full, whether the shelves are filled with the right article references, whether articles are sufficiently stocked in the shelves, etc.) is crucial for improving the revenue of the store, and the operational efficiency of article picking. For customers, satisfaction is improved because of optimal availability of the articles and reduced time for article picking, and the attractiveness of the salespoint is improved. For employees involved with preparation of the shelves and stock management, this results in improved productivity.

A first issue which must be addressed is shortage of articles usually on sale in the salespoint. The situation in which a customer, who intends to buy a specific item usually available in the salespoint, finds that said item is out-of-stock in the salespoint, is inconvenient on two levels: there is an effective loss due to the missed occasion of sale, and there is a risk that the dissatisfied customer temporarily or permanently switches to another salespoint of a competitor.

In theory, shortages should not happen if every sale of an item immediately impacts the central stock management file at cash-out, and if each item on sale is re-stocked as soon as the level of availability of said item falls below a critical threshold. Another critical element for avoiding shortages is that the facing (i.e. for a given area of the shelf, the length of the row and the number of lines dedicated to the article) is adapted to the real consumption rate of the product. This facing may have to vary taking into account seasonality and fluctuating demand for the product. If the facing is too low compared to the real consumption rate, the product may have to be re-stocked at a very high frequency if a shortage is to be avoided. As the facing information is part of the information present in the realogram, a need exists for a method which provides reliable information on the current state of a gondola, including (but not limited to) empty spaces, the articles currently present in the gondola, and facing information.

Besides, the central stock management file is not always perfectly synchronized with other functions of the information systems of the salespoint, such as supply or cash-out. Customers still frequently find empty shelves for the products they intend to find. This is especially inconvenient since the customer can see, from the shelf label disposed in the vicinity of the empty product slot, that there is a product missing.

In some known systems for article layout management, empty areas can be detected on a view of the front of the shelf. Though, the detected empty spaces are not associated automatically with corresponding article references, as said known systems do not make use of the information present in a realogram database. Thus, said known systems do not allow efficient management of shortages of articles.

Another issue is compliance of the available articles in the shelves with the planned layout in the realogram. A key issue here is, for a given area of a shelf, compliance between the expected article reference contained in the realogram for said area, and the article which is indeed shown in the area. It is detrimental to the efficiency of the salespoint to have a layout of articles which is not compliant with the expected layout, such as a mistaken shown article reference, or a mistaken facing (for instance, only one line of a specific article in a shelf, whereas there should be two lines of said article). As mentioned above, a mistaken facing with respect to the expected facing is likely to result either in waste of space in the gondola, if the real facing is too high, or in a higher likelihood of shortage if the real facing is too low. Besides, brands on sale within the salespoint may have specific requirements as to how their products must be shown in the shelves.

In light of the issues identified above related to article layout control, it is estimated that there is potential for an increase of up to 15% of the turnover of a salespoint. Avoiding shortages amounts to about 3% to 5% of potential revenue increase; ensuring that the products which are indeed available in the salespoint are situated at their right expected location with respect to the information of the realogram database, and easily trackable by the customer, could amount to an increase of 5%; and having a reliable realogram database personalized to each particular salespoint (i.e. not one single expected planogram for several salespoints) could amount to a 3% to 5% increase.

A need therefore exists for a solution which allows detection of layout information of articles on sale in the shelves, so that the personnel of the salespoint is alerted of any issues and is able to take action swiftly, for instance by ordering and/or re-assorting articles that are out-of-stock in the shelves, or readjusting the layout of articles when said layout is not compliant with the information available in the realogram database.

SUMMARY OF THE INVENTION

The solution described below overcomes the aforementioned deficiencies of the prior art with a system for check of compliance of the layout of articles with the information present in the database of the salespoint. Said system is able to track directly any discrepancy (such as an empty area of the shelf wherein an article should be available, or a wrong facing for an article, or an article with a wrong front view) by image recognition.

For this purpose, and according to a first aspect, the invention concerns a method for checking the layout of articles in a gondola of a sales area with a realogram database representing the expected arrangement of articles in the gondola, each gondola comprising at least one electronic shelf label, wherein each electronic shelf label corresponds to a matching area of the gondola with a single product slot field, said slot field comprising a gondola number, along with a row number corresponding to one of consecutive rows of electronic shelf labels within one particular gondola, and a label number corresponding to one of consecutive electronic shelf labels within one particular row, the method comprising computer-implemented steps of:

acquisition, by an imaging device, of an image of the gondola;

automated detection, in the acquired image of the gondola, of electronic shelf labels;

automated detection of rows of electronic shelf labels in the acquired image;

and, for a given electronic shelf label visible in the acquired image:

determination of the row number and label number of said electronic shelf label, and determination of the corresponding product slot field, determination of the matching area of the gondola corresponding to said electronic shelf label in the acquired image, detection of layout information relating to articles shown in said matching area of the gondola, by image recognition using the acquired image, access to a realogram database, each slot field being associated with an article identifier in said realogram database, identification in the realogram database of the article identifier associated with the determined slot field, and a check of the detected layout information in relation with the expected layout information stored in the realogram database for the identified article.

The hereby provided system takes advantage of the fact that each area of a gondola corresponds to an electronic shelf label (or ESL) which is disposed in the immediate vicinity of said area, for example in the row of the gondola situated below said area. From an acquired image of a gondola, typically the front of the gondola, layout information for articles shown in a given area of a shelf can be detected by automated image recognition. Said layout information can be put into correspondence with identifiers of areas of the gondola in a database, which are referred to below as "slot fields", by the intermediary of an electronic shelf label or ESL. Indeed, automated recognition of ESLs on the acquired image allows the system to identify the slot fields which correspond to the areas of the gondola.

Said method is advantageously, but not restrictively, completed by the following features, taken alone or in any technically feasible combination:

The method further comprises, after acquisition of the image of the shelves, a step of identification of at least one empty area of the gondola in said acquired image, by image recognition, wherein for said given electronic shelf label, the layout information detected in the matching area of the gondola is an information that said area is empty, leading to a determination that the identified article is out-of-stock in the gondola;

In the latter case, identification of empty areas of the gondola is carried out by color recognition with respect to a predetermined pattern of the back of the gondola, or a row of the gondola;

The method further comprises a step of retrieval of a preregistered image associated in an article image database with the identified article, wherein the preregistered image is an expected front view for the determined article identifier, and also comprises a step of calculation of a similarity rate between, on the one hand, the zone of the acquired image corresponding to the real front view for the determined area of the gondola, and on the other hand, said preregistered image of the expected front view, the method outputting a list of determined slot fields and/or article identifiers for which it is determined, from the value of the similarity rate, that the front view on the gondola is unsatisfactory;

The method further comprises a step of retrieval in the realogram database of expected facing information for the determined slot field, and the method also further comprises a step of detection, by image recognition, of compliance between the expected facing information and the real facing visible on the acquired image for the product slot identified by the determined slot field;

In the latter case, the expected facing information is a number of consecutive lines of items of the same article in the gondola;

The method further comprises a step of visual display in a graphical interface of a representation of the gondola, along with visual signals highlighting the empty areas of the gondola, and/or a visual alert that the article identifiers and/or slot fields associated with the detected empty product slots must be re-stocked, and/or visual signals highlighting the areas of the gondola that do not match the expected front view, and/or visual signals highlighting the areas of the gondola that do not match the expected facing;

Automated detection of electronic shelf labels on the acquired image is carried out by pattern recognition, with respect to a predetermined set of possible electronic shelf label shapes;

For a given detected electronic shelf label of the acquired image, the matching area is defined as follows: the zone of the acquired image situated immediately above said electronic shelf label, and situated between said electronic shelf label and the consecutive shelf label on the right side, is determined as an image of the matching area of the gondola which corresponds to said electronic shelf label;

According to a second aspect, a computer program product is provided, comprising code instructions for implementing the above-mentioned method for checking article layout.

According to yet another aspect, the invention proposes a system for checking the layout of articles in a gondola of a sales area, said system comprising:

a plurality of electronic shelf labels arranged on the gondola, a server which is configured to communicate with a labels database, wherein each electronic shelf label, identified by a unique label identifier, is associated with a single article identifier, the electronic shelf label also corresponding to a matching area of the gondola with a single product slot field, the server also being configured to communicate with a realogram database, wherein each slot field is associated with an article identifier, an imaging device which is able to acquire an image of the gondola, the server being configured to:

run on an image of the gondola provided by the imaging device an automated recognition of the electronic shelf labels, determine the slot fields which correspond to the electronic shelf labels, and the matching areas of the gondola which correspond to the electronic shelf labels, detect, in said image, layout information for an article visible in a given area of the gondola, check the detected layout information, in relation with information stored in the realogram database.

The system defined above can comprise, in an advantageous and non-limiting manner, the following features, taken alone or in any technically feasible combination:

The server is further configured to communicate with an article image database, wherein each article identifier is associated with a preregistered image of an expected front view for said identified article, the server being able to compare a zone of an acquired image corresponding to a real front view, making for detected layout information, with an expected front view;

The detection of layout information in the acquired image comprises automated recognition of empty areas of the gondola;

The detectable layout information in the acquired image comprises a real facing visible in an area of the gondola, such as the number of lines in said area of the gondola, the server being able to compare said real facing with expected facing information retrieved in the realogram database.

BRIEF DESCRIPTION OF THE DRAWINGS

Other characteristics, objectives and advantages of the invention are set forth in the following detailed description, which is solely illustrative and non-limiting, and is to be read in conjunction with the following annexed drawings:

FIG. 13 is a schematic view of a step of check of the detected number of lines of products with respect to the expected number, as part of the method illustrated in FIG. 11.

DETAILED DESCRIPTION OF PARTICULAR EMBODIMENTS

Figure 1:
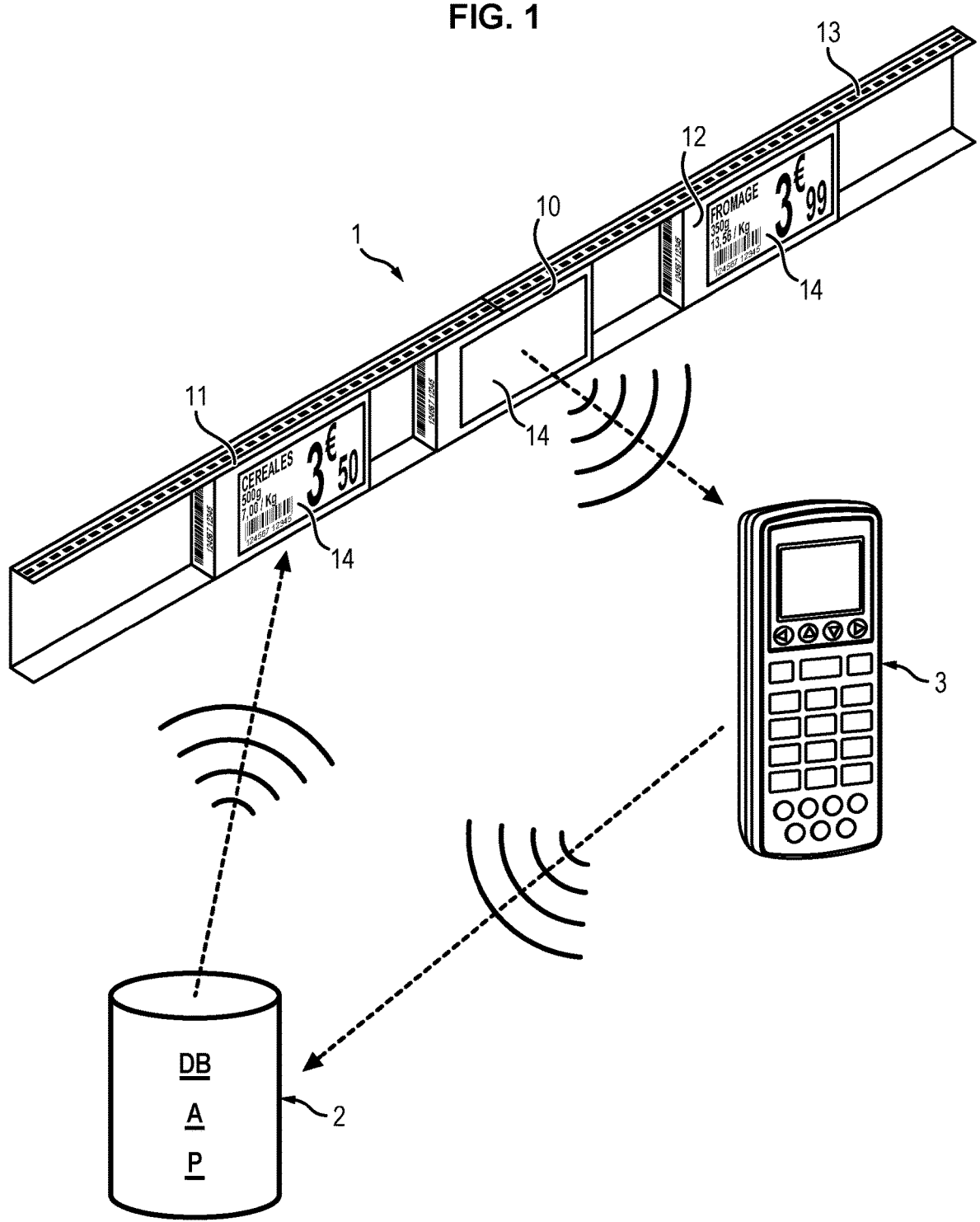
FIG. 1 represents a price display system known of the prior art, comprising electronic shelf labels, a central server and a mobile terminal.

In all the following, several methods related to partially or completely automated shelf layout management in a salespoint will be described. Similar elements in the appended drawings which will be described below will be designated by the same numerical references.

In the following, whenever reference is made to an electronic shelf label, or ESL, "corresponding to" a matching area of the gondola, this means that said electronic shelf label is intended to display information relating to the products made available to the customer in said area of the gondola. In practice, this means that, with the ESL displaying article information for a specific article identifier, said corresponding area of the gondola must contain a certain number of items of said article. An "area of the gondola" is therefore defined as a geographic zone of a gondola which can contain, or not contain, one or several lines of a same product. It is generally situated in the horizontal zone between two consecutive horizontal rows of a gondola, covering a particular length of said zone.

The system for checking article layout which will be described below is able to identify by itself the correspondence between a "matching area" of a gondola visible in an acquired image, and an ESL also visible in said image. The system can use predetermined rules for automated recognition, starting from a given ESL, of the matching area of the gondola (i.e. recognition of the zone of an image wherein said area of the gondola is visible).

In the following, we consider a condition for identifying the matching area defined as follows: for a given detected ESL situated in a gondola, the zone of an acquired image of said gondola situated immediately above said ESL, and situated between said ESL and the consecutive ESL on the right side, is determined as an image of the matching area of the gondola. We could consider the problem in reverse: for a given area of a gondola, the corresponding ESL is the nearest ESL situated in the row immediately below said area of the gondola, on the left of said area.

In addition, each area of a gondola is identified by a unique and specific number, referred to below as a "product slot field" or "slot field". A specific mode for defining slot fields will be described below. Whenever reference is made to an ESL "corresponding to" a slot field, this means that the ESL is intended to display information relating to the products shown in the matching area of the gondola identified by said slot field.

Besides, reference will be made below to the detection of "layout information" for articles shown in a gondola. Layout information means, in the broader sense, any information about the status of articles on sale in the gondola which can be inferred from automated recognition using an image of the gondola (generally a view of the front of the shelf). Specific kinds of layout information include, for instance, an empty or non-empty state of an area of a gondola (indicating whether an article is out-of-stock in the shelf), or a number of lines of the same product visible in the gondola.

FIG. 1 schematically represents, in an exemplary and non-limiting manner, an electronic shelf label management system which can be rolled out in a sales area in order to display price information to customers. Such system is similar to a system described in the international patent application having the publication number WO2017/017366 filed on behalf of the Applicant. This system comprises an electronic shelf labelling sub-system 1 installed in a gondola, a central server 2, and a reading device 3. The central server 2 can additionally communicate, via a local or remote network, with a display system which is not represented on FIG. 1. The central server 2 also communicates with an imaging device or a plurality of imaging devices, which are able to take pictures of the gondolas of the salespoint in order to monitor the layout of articles, by any image capture method. Communication between the reading device 3 and the central server 2 can be carried out according to any communication network such as Wi-Fi, 3G or 4G, or DECT.

Electronic shelf labels (also referred to in the following as ESLs) are preferentially arranged on shelves of the whole of the sales area. On FIG. 1, three ESLs 10, 11, 12 are arranged on a shelf rail 13 located on the edge of a shelf for showing articles on sale. Each ESL comprises a display 14, such as a liquid crystal display screen, for display of product information. This information typically comprises the price of the article, in compliance with regulatory requirements, along with other required information such as price per kilo. Each ESL is identified by a unique label identifier, which can be displayed on the casing of the ESL, for example via a barcode. This label identifier can typically be a specific alphanumerical sequence. This label identifier unmistakably identifies each shelf label of the salespoint. In addition, each of the electronic shelf labels corresponds to one article on sale, which can itself be identified by a specific article identifier, such as a EAN code.

The ESLs are preferably spread all over the sales area, so that the price information provided in the whole area is consistent with the information stored in the central server 2.

Communication between an ESL, such as shelf label 10, and the remaining components of the electronic shelf label management system depicted on FIG. 1 can operate as follows. The ESL comprises a radiofrequency communication module, which can receive article information encoded in radiofrequency signals emitted by a central station connected with the central server 2. The ESL typically comprises an antenna and a chip of the NFC or the RFID type. The ESL also comprises a memory for storing said transmitted data, and a microcontroller for displaying the data on screen 14. The reading device 3 can communicate with the ESL via wireless communication through a radiofrequency peripheral of the ESL. In this way, the reading device 3 can be used for associating the ESL with an article identifier upon installation of the ESL. The reading device 3 is also equipped with a module for optical recognition of the label identifier of the ESL, using the barcode.

As a result, all of the components 1, 2, 3 of the shelf label management system can communicate via wireless communication.

The central server 2 comprises, a minima, a labels database DB which comprises association information between the electronic shelf labels (for instance ESLs 10, 11, 12) and articles on sale, for instance in the form of table associations between a unique label identifier and a EAN number of an article. Here, the central server 2 comprises, in addition, a realogram database P, and an article image database A. However, it is to be noted that said database A is not necessary for all of the methods which will be described below.

The realogram database P comprises association information between product slot fields, article identifiers of articles on sale in the salespoint, and label identifiers of ESLs disposed on shelves of the salespoint. Product slot fields can take any form which allows unequivocal identification of product slots of the shelves.

In all the following, a product slot field comprises three numerical indices (not visible on FIG. 1). The first index i corresponds to a gondola of the salespoint, which can comprise one or a plurality of series of shelves which are stacked one on top of each other parallelly. The second index j corresponds to a particular row of the gondola i. In all the following, rows are counted consecutively within one gondola, departing from the lowermost row (row 0) up to the uppermost row. The third index k corresponds to a particular electronic shelf label within the row j. In all the following, ESLs are counted consecutively along a row (i.e. along a shelf rail), departing from the leftmost ESL (ESL 1) up to the rightmost ESL. The combination of indices i, j, k in a triplet (i,j,k) allow unambiguous identification of a single electronic shelf label. The article identifier which is associated in the realogram database P with a product slot field (i,j,k) is designated by term $P_{ijk}$. The unique label identifier, identifying one ESL of the salespoint, associated with the product slot field (i,j,k) is noted $L_{ijk}$. In label database DB, the unique label identifier $L_{ijk}$ will thus be associated with the article identifier $P_{ijk}$. A graphical representation of a realogram database P will be described below in relation with FIG. 10.

The article image database A associates each article identifier (such as EAN number) with a numerical image, in any usual image format, corresponding to an expected image of a front view of the article identified by said identifier.

In addition, the central server has access to article information, associating each article identifier with the necessary information for operation of the salespoint, including price information and other information to be displayed to customers, management information such as inventory information, etc.

Label database DB, article image database A and realogram database P can jointly be contained in a single file of the salespoint, or else, be contained in separate files. Management of several salespoints can be managed remotely by a single central file, or else each salespoint can possess its own file, or set of files.

Besides, the realogram database P is optionally, but very advantageously, updated in real-time with respect to the information present in the labels database DB. This means that, for a given ESL having a predefined location in a shelf—and being held fixed at said location, as said ESL is fixedly engaged with a shelf rail 13 of said shelf, as visible in FIG. 1—and therefore corresponding to a given slot field (i,j,k), if the information related to said ESL is modified in the labels database DB (by association to a new article identifier, or re-association with a new article identifier distinct from a previous associated article identifier), information in the realogram database P will be modified accordingly, so that the corresponding slot field (i,j,k) is also associated with said new article identifier. For example, the realogram can comprise associations between label identifiers and slot fields, so that when an given label identifier is re-associated in the labels database DB with a new article identifier, said modification is reflected in the realogram database P immediately.

A method for checking article layout in a shelf, in the form of detection of layout information (with the broad sense preliminarily discussed above) will now be described with reference to FIG. 2.

At step 210, a numerical image of a gondola or a plurality of gondolas, comprising the gondola i, wherein the facing of articles shown to the customers is visible, is acquired by the imaging device in communication with central server 2. An image I of gondola i is obtained, and stored in the memory of the central server 2.

At step 220, automated detection of all present ESLs on the image I is carried out. This automated detection of electronic shelf labels on the acquired image is typically carried out by pattern recognition, with respect to a predetermined set of possible electronic shelf label shapes which are stored in the memory of the central server 2.

After all electronic shelf labels visible on the image have been singled out, a step 221 of detection of rows (i.e. detection of sets of consecutive ESLs located on the same shelf rail 14) can be carried out. A row j is detected for each set of detected ESLs resulting from previous step 220 which are approximately aligned. The rows can then be numbered starting from 0, from the lowermost row to the uppermost row.

At a step 222, the detected shelf labels of each row j are numbered consecutively, from the leftmost shelf label to the rightmost shelf label, starting from one.

At this point, the central server 2 knows how many rows j are visible in the gondola i, and how many consecutive shelf labels are arranged on each shelf rail corresponding to each row. The server is therefore capable of attributing a slot field (i,j,k), as defined above in relation with FIG. 1, to each ESL visible on the acquired image I.

All the steps of the method of FIG. 2 which will now follow, i.e. steps 230 to 260, will be described for a single given ESL visible on the acquired image. However, said steps can be implemented as many times as desired. In particular, they can be repeated for every ESL of a whole shelf, or for every ESL of a geographic zone of the shelf, for the purpose of automatically detecting events which can occur in said zone such as out-of-stock shelf areas, or mistaken facings of articles.

Starting from a given ESL, which corresponds to a slot field (i,j,k), the matching area of the shelf, as visible on image I, which corresponds to said ESL can be identified by the server at a step 230. In said step, the server uses a predetermined condition. As a reminder, an exemplary condition is that the area of the shelf situated immediately above the given ESL, between said ESL and the consecutive ESL on the right side, is the area of the shelf which corresponds to said given ESL. The man skilled in the art will have no difficulty understanding how recognition of the matching area can be done by the server.

Then, at step 240, the server detects layout information relating to the determined area of the shelf. Specific modes of carrying out such layout information detection will be explained below in further detail, in relation with several types of layout information corresponding to several embodiments.

At this point, the system is able to put into correspondence the detected layout information, and the slot field (i,j,k) which corresponds to the given ESL. Indeed, as a result of previous step 222, the system knows the order of the ESLs in the shelf, and it is therefore able to establish the slot field (i,j,k) which corresponds to each visible ESL. In the method of FIG. 2, the slot field for a given ESL can be determined by the server at any point between the end of step 222 and the beginning of step 250.

Then, at step 250, reference is made to the information available in a realogram database P. The aim here is to connect the layout information detected at step 240 with a specific article identifier. As a reminder, realogram database P contains associations between slot fields (i,j,k) and article identifiers $P_{ijk}$, such as EAN numbers of articles. In this step 250, the article identifier $P_{ijk}$ for slot field (i,j,k) is retrieved. The identifier which is retrieved in relation with this product slot field corresponds to the article which is expected to be stocked and available for sale within the area of the shelf corresponding to said product slot field.

Finally, at step 260, the detected layout information is checked. Typically, knowing the article identifier $P_{ijk}$ for the article which is expected to be shown in the area of the shelf determined at step 230, reference can be made to information available in the realogram database P for said article $P_{ijk}$, or reference can also be made to any other database wherein article identifiers $P_{ijk}$ are associated with other information related to article layout, such as expected front views of articles (see description below for FIG. 10).

Figure 2:
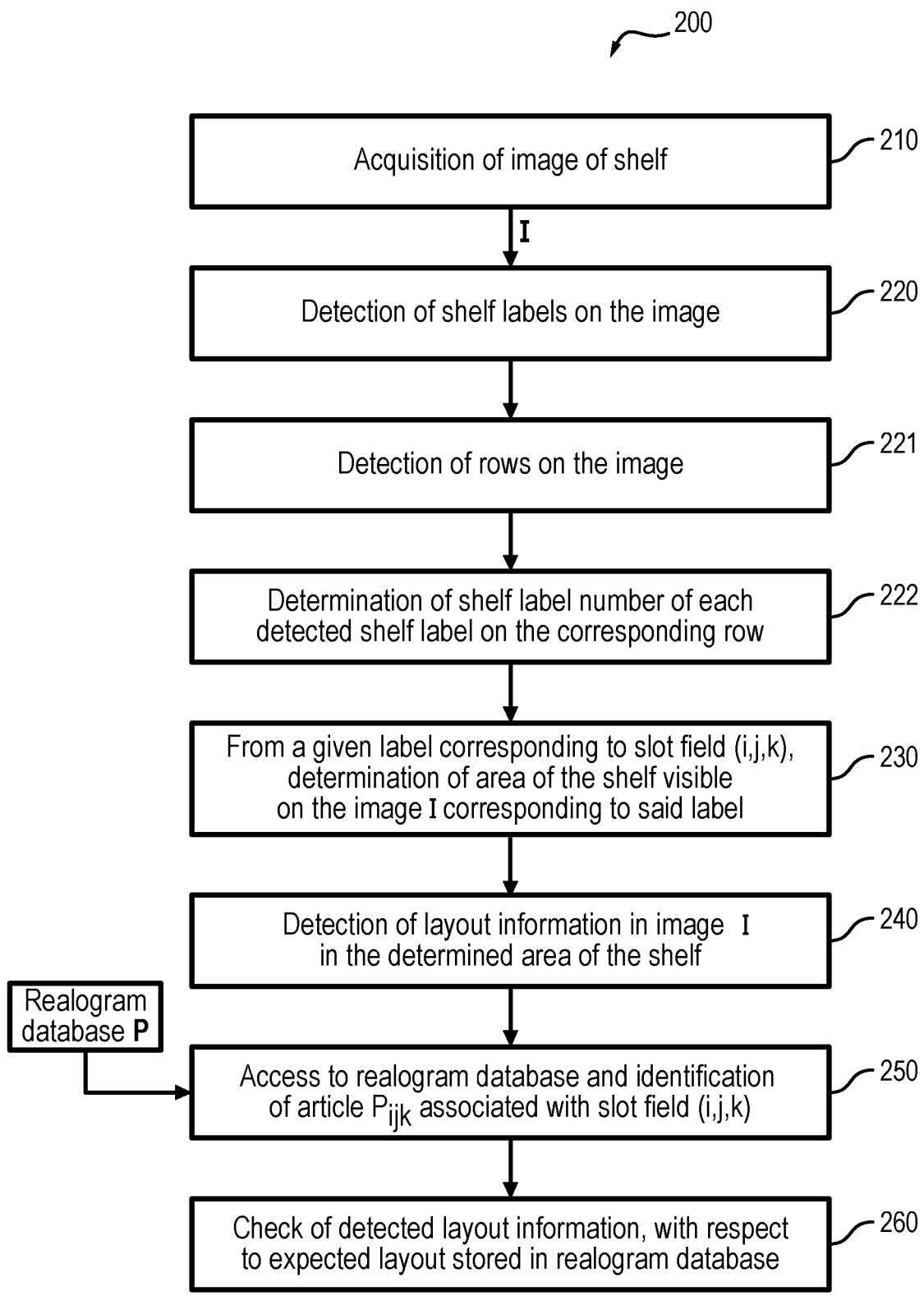
FIG. 2 schematically represents steps of a method for checking article layout in a shelf.

The general method of FIG. 2 provides a very simple and effective way of controlling the layout of articles within a shelf. For instance, the method can be run periodically at regular intervals, for every detectable ESL of a shelf. Since the link between detected layout information for the articles in the shelf, and the expected information of the realogram database, is done automatically by intermediary of the ESLs, there is little to no need for human input. A list of unsatisfactory articles, or unsatisfactory slot fields, for which the check of step 260 is negative, can be automatically provided to an operator, which will allow them to take appropriate action to correct the layout of articles.

An exemplary embodiment of method 200 will now be described. Said embodiment relates to a method 300 for detection of empty areas inside a particular gondola i, in relation with FIG. 3 and illustrative FIGS. 4 to 7.

Here, the layout information which is detected is simply the presence or absence of an article in a given area of a shelf. Besides, in this particular embodiment, layout information is detected for each ESL detected in the acquired image, and not only for a given ESL.

In other words, the method is run on a whole gondola i, for detecting all empty areas within said gondola i.

However, the method could similarly be run for any given set of ESLs among the totality of detected ESLs.

Steps 310 to 322 exactly match steps 210 to 222 described above. As a result of steps 310 to 322, the server therefore detains an acquired image I of gondola i, and has detected every ESL on said gondola, along with the rows j of ESLs within said gondola and the order of ESLs in each row.

With reference to step 320 of ESL detection, display system of the central server 2 can display in real-time the results of the detection. An exemplary view is given in FIG. 4: on said view, detected zones of image I corresponding to ESLs are shown in dotted lines, among which ESLs 10 situated on shelf 13. Gondola i contains several shelf rails 13, with several ESLs being arranged on each of the shelf rails 13. At this stage of the method, all parts of the image I corresponding to ESLs have been singled out by pattern recognition. Every shape on the acquired image I corresponding to the shape of an ESL is recognized by the central server 2 as one electronic shelf label.

With reference now to step 321, the rows can then be numbered starting from 0, from the lowermost row to the uppermost row. At a step 322, the detected shelf labels of each row j are numbered consecutively, from the leftmost shelf label to the rightmost shelf label, starting from one. The result of said operations is displayed in FIG. 5. For the sake of explanation, a particular electronic shelf label 10, more precisely the second shelf label starting from the left in the lowermost row, is singled out.

Figure 3:
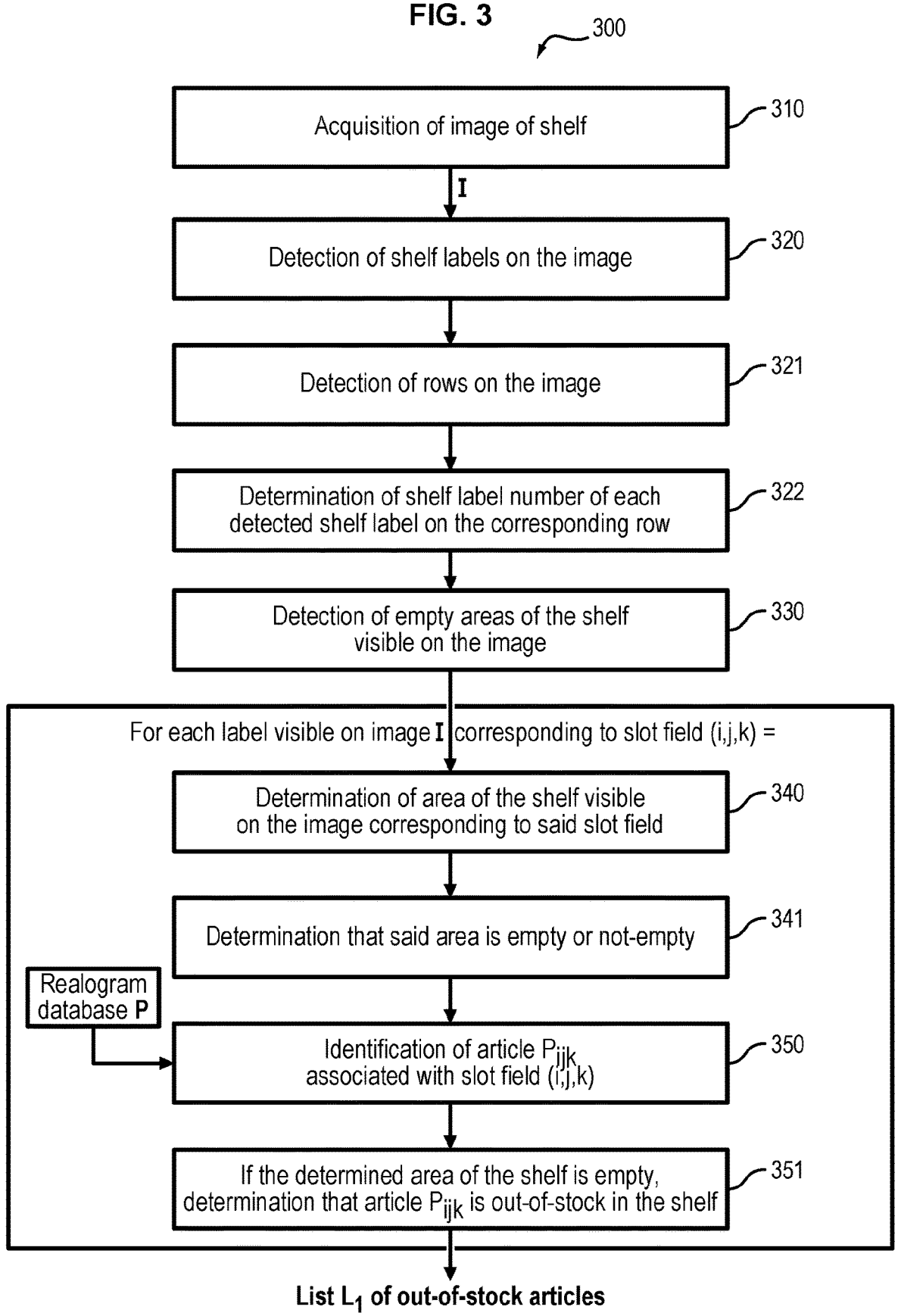
FIG. 3 schematically represents steps of a method for checking article layout in a particular embodiment, wherein empty areas of a shelf are detected.
Figure 4:
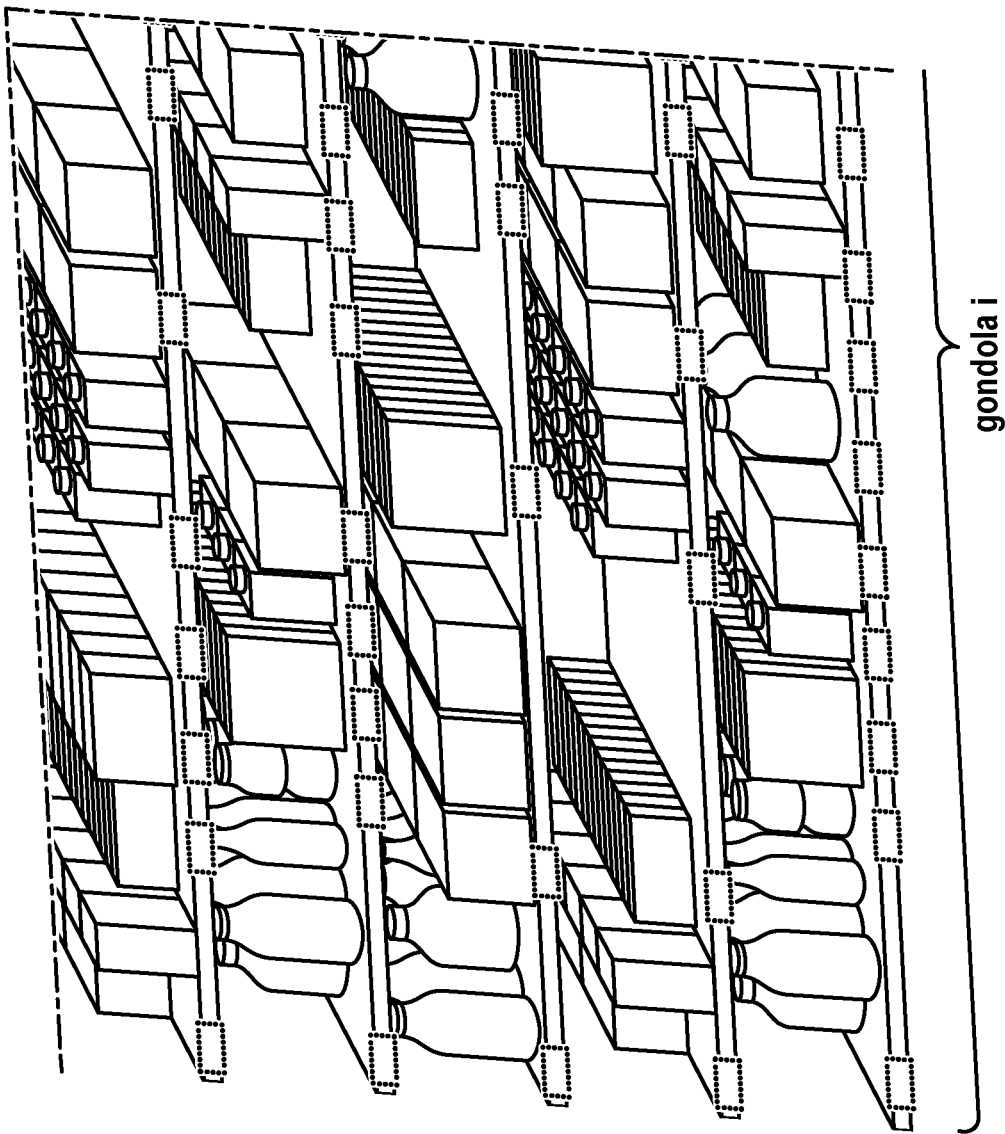
FIG. 4 is a schematic view of the shelf label detection step of the method illustrated in FIG. 3.

Coming back to FIG. 3, method 300 then comprises a supplementary step 330, for detection of empty areas of the shelf visible on the image I. In this step, all empty areas of the shelf are identified. Here, identification of empty product slots is carried out after shelf labels and rows have been detected at steps 320, 321 and 322. However, it would also be possible to detect zones of the image I corresponding to detection of empty product slots, prior to detection of the shelf labels and of the rows.

Several modes for image reading and detection of the empty areas can be used. Empty slot detection can be carried out by color recognition with respect to a predetermined pattern of the back of the shelf, or a row of the shelf. For example, if the top surface of each shelf is a vivid light green, with the image I purportedly taken at an angle which allows to see the top surface of the shelves, step 330 can reside in detection of the vivid light green zones of the image. In order to avoid a zone of the image corresponding to a non-empty area being confused for an empty area, the top surface of the shelves can be covered with a specific pattern, and detection of zones of the image I with said pattern can be carried out at step 330. Alternatively, at step 330, zones of lower luminosity can be searched in the image I: if the lighting of gondola i is in operation, product slots which contain items will have a lighter appearance than empty product slots on the image I.

During step 330 of identification of empty areas, the server can display to a user the processing results of the image I of the gondola, as the central server 2 progresses through the detection. The result after processing of the image I according to step 330 is schematically displayed in FIG. 6.

Figure 6:
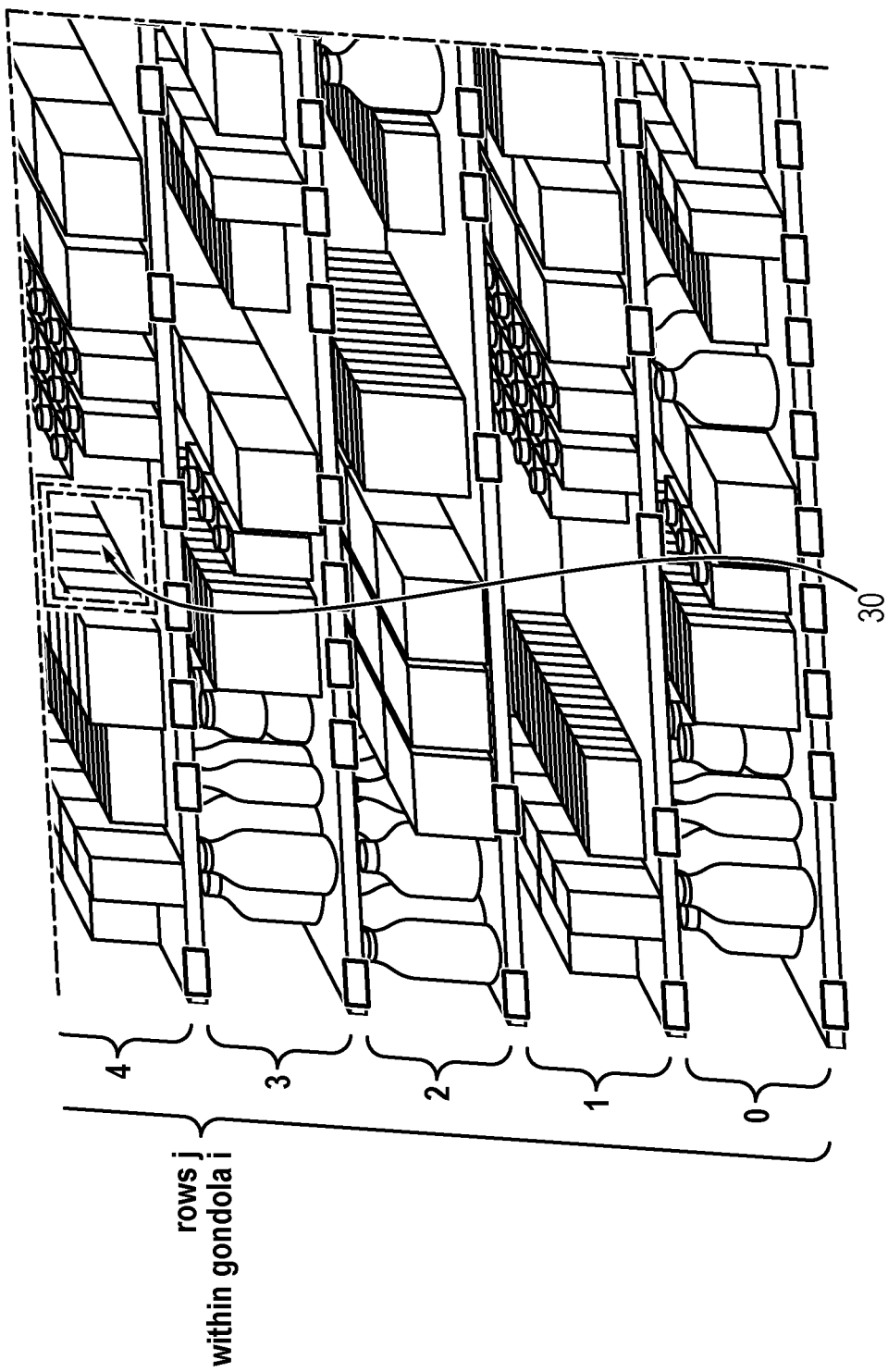
FIG. 6 is a schematic view of an empty shelf area detection step of the method illustrated in FIG. 3.

For the sake of explanation, a particular empty area 30 of the shelf has been singled out in FIG. 6. This empty area is located in row 4 of gondola i, at the fourth position in said row.

As an outcome of step 330, the central server 2, on the one hand, has singled out zones of the image I corresponding to empty areas of the shelf. On the other hand, rows j are detected and each shelf label present in image I can be associated with a product slot field (i,j,k).

The empty areas must then be put into correspondence with articles which are out-of-stock, or else, with missing realogram references in the system. Here, as part of the method 300, the server carries out steps 340 to 351 for each visible ESL, including ESL 10 of FIG. 7.

Said ESL 10 is the fourth shelf label of row 4, departing from the left, which amounts to an index k=4. Besides, it is already known that the gondola number is i, as the imaging device is set to capture an image of a predetermined gondola, or plurality of gondolas. Thus, the corresponding product slot field for said ESL 10 is (i,4,4).

Figure 5:
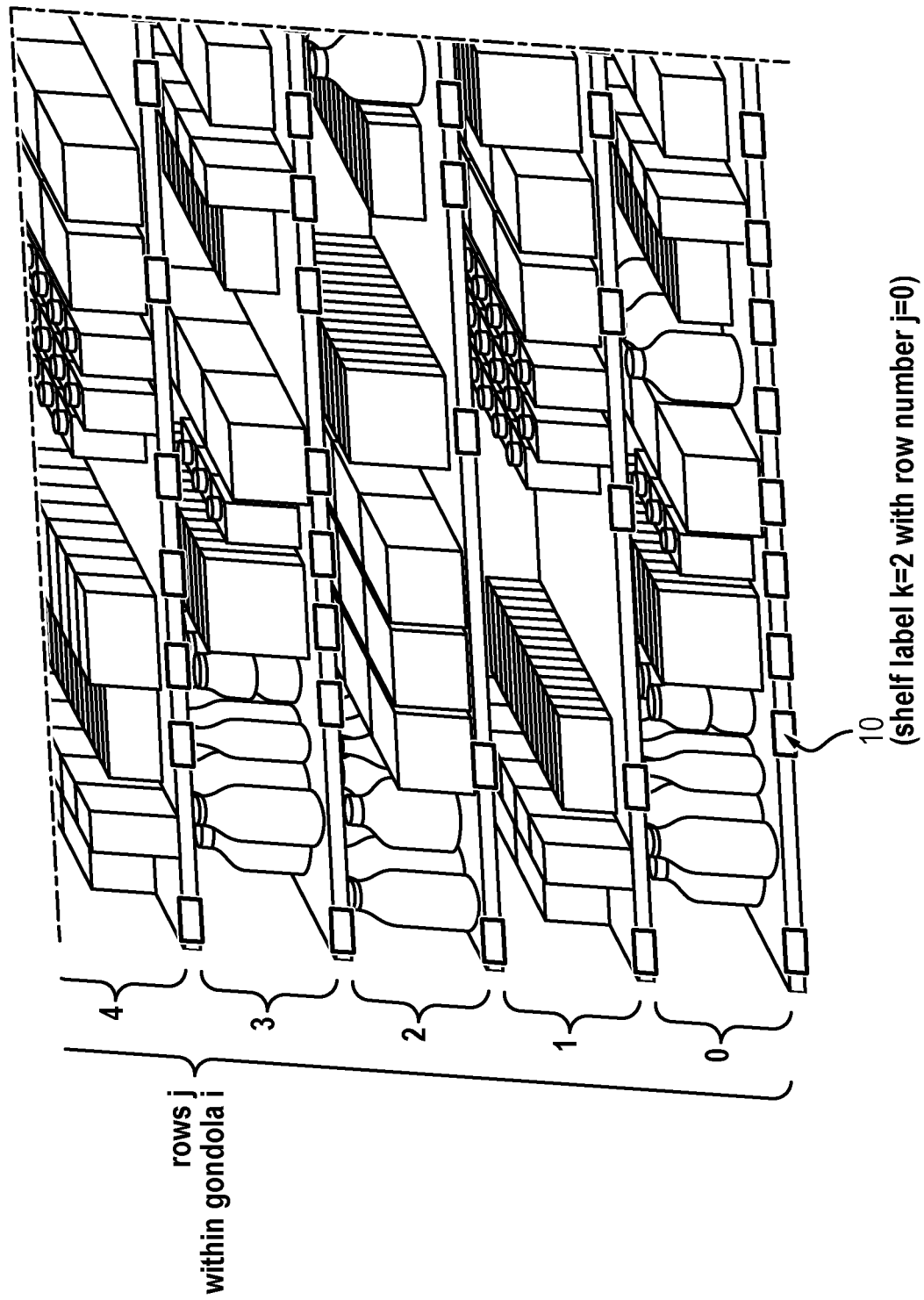
FIG. 5 is a schematic view of row detection and shelf label count steps of the method illustrated in FIG. 3.
Figure 7:
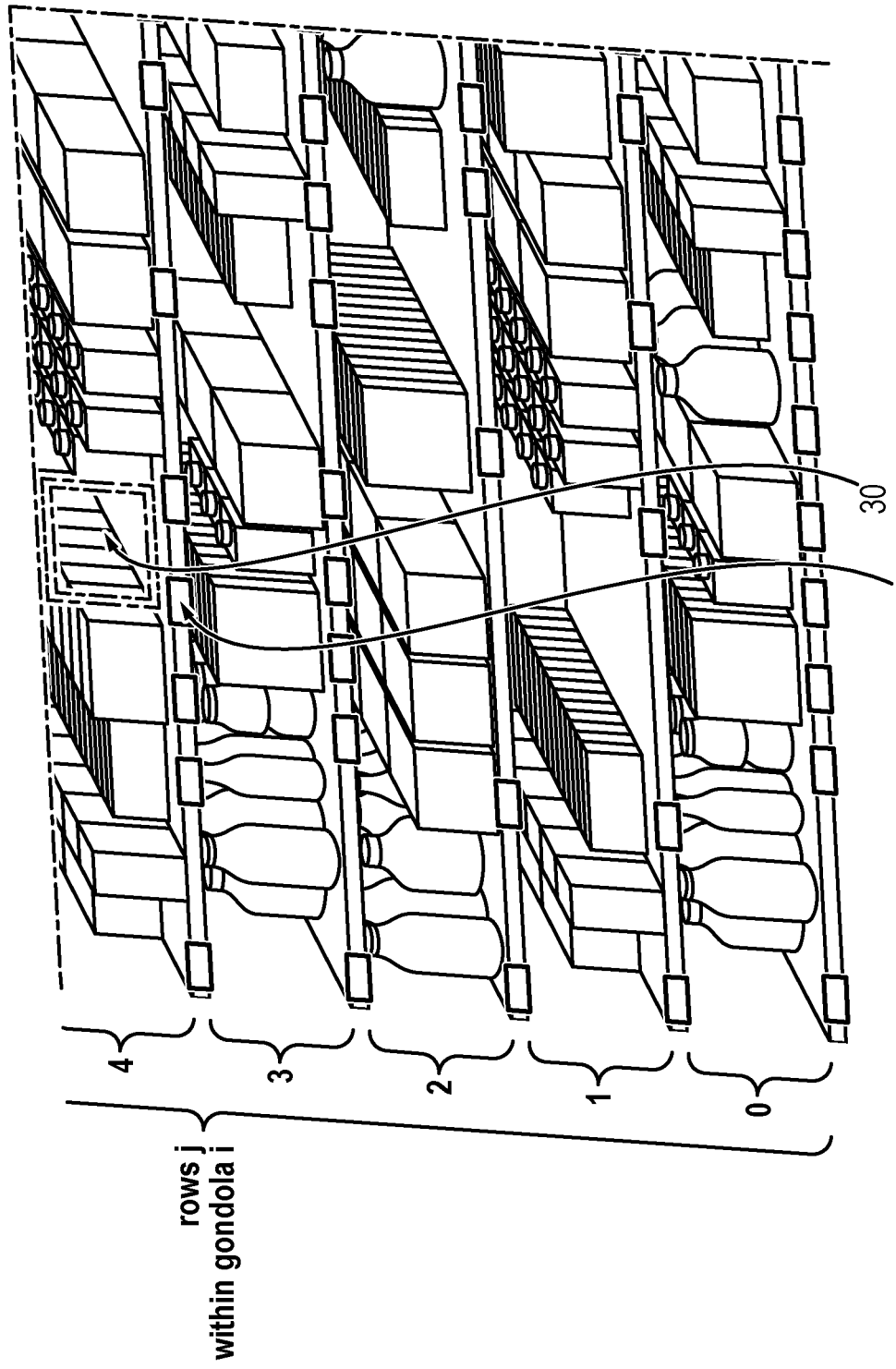
FIG. 7 is a schematic view of a step of determination that an article associated with the slot field corresponding to the detected empty area is out-of-stock, as part of the method illustrated in FIG. 3.

At step 340, the server determines the matching area visible in the image I (i.e. the area of the shelf) corresponding to the ESL 10 spotted in FIG. 5, said matching area having the reference numeral 30 in FIG. 7.

Then, at step 341, the server is able to establish, for said ESL 10, whether the corresponding area of the shelf (i.e. area 30) is empty. In the case of FIG. 6, area 30 has indeed been detected as an empty zone.

Then at step 350, by reference to the realogram database P, the server retrieves article identifier $P_{i44}$, which is associated with slot field (i,4,4).

Finally, at step 351, since area 30 of the shelf is empty, there is a determination that article $P_{i44}$ is out-of-stock in the shelf.

Alternatively, if a determined area of the shelf corresponding to a given ESL is found to be empty at step 341, and if the server fails to retrieve an associated article identifier at step 350, it is possible that said determined area of the shelf has not been associated with an article, in which case there is a realogram reference missing. A specific alert can be implemented in this case, in order to warn the personnel that the realogram must be completed.

After steps 340 to 351 have been run for every ESL that has been previously detected at step 320, a list $L_1$ of out-of-stock articles $P_{ijk}$, or alternatively a list of slot fields corresponding to empty areas of the shelf, can be handed out to a user.

Optionally, after step 351, a graphical interface of the central server 2 can display to the end user a visual representation of the shelves, with signals notifying the empty product slots. This visual representation of the shelves can correspond to the representation of FIGS. 4 to 7, or else it can be any type of visual representation of the shelves.

For instance, said visual representation can feature visual signals highlighting the empty product slots of the shelves, with specific signs such as rectangles or circles. Otherwise, the central server 2 can send a visual alert that the slot fields associated with the detected empty areas must be re-stocked, such as a pop-up message. Alternatively, there can be no visual representation of the shelves to the end user, and the slot fields corresponding to empty areas can be handed out to the end user in numerical form.

Figure 8:
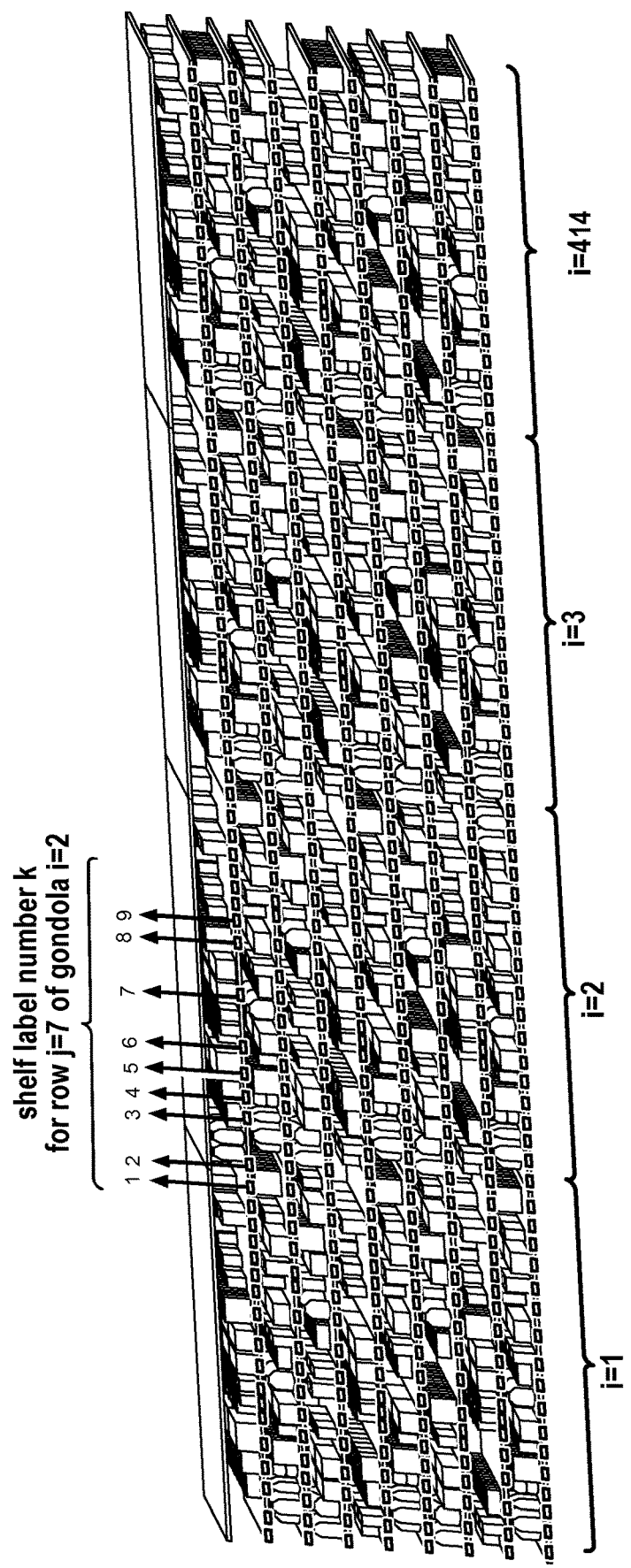
FIG. 8 is an alternate schematic view of shelves of a salespoint, wherein several gondolas are distinguished.

FIG. 8 provides an alternate type of visual representation of gondolas of a salespoint. Here, several gondolas i=1,2,3,4 which are juxtaposed to each other are shown. The row corresponding to row index j=7, inside the second gondola, is highlighted. Within said row, shelf labels k=1 to k=9 are shown. This type of joint visual representation of several gondolas can advantageously be used by a human user, along with visual signals highlighting empty areas detected by method 300 and/or alert messages, in order to jointly monitor empty areas in several gondolas.

The method 300 of FIG. 3 therefore provides a very simple way to automatically detect empty areas. The central server 2 carrying out said method can be interfaced with a system for stock management, in order to take appropriate action. This method is very simple, as it relies on simple image reading.

A second embodiment will now be described in relation with FIG. 9. A method 900 for detection of unsatisfactory front views inside a shelf, with respect to expected front views of an article image database A, is provided. In this particular embodiment, the "layout information" is a view of the front side of the item which is visible in a determined area of the shelf.

First, at step 910, an image I of a gondola or a plurality of gondolas, including gondola i, is acquired, similarly to step 310 of the method of FIG. 3. As a result, an image I of gondola i is obtained, and stored in the memory of the central server 2.

Using said acquired image I as a basis, a step 920 of recognition of ESLs on the acquired image and ordering of said ESLs is carried out, similarly to previously described steps 320 to 322 of the method of FIG. 3.

Then, at step 930, similar to step 340 of the method of FIG. 3, the matching area of the shelf corresponding to a given ESL is determined. Advantageously steps 930 to 960 are carried out for all ESLs detected at step 920.

On the other hand, as the rows of the acquired image I have been automatically detected and shelf labels within each row have been counted, the considered electronic shelf label can be matched with a slot field (i,j,k) at step 931. Alternatively, slot fields could be determined before ESLs are put into correspondence with areas of the shelf (and steps 930 and 931 could therefore be reversed).

Finally, at step 932, inside the determined area of the shelf, the server singles out a zone of the image I corresponding to a real front view for an article. If the determined area contains only one line of items, the real front view is determined as the front face of the first item in line.

If the determined area of the shelf contains more than one line of items, either a plurality of real front views is considered for this single area of the shelf, and the following step 960 of comparison will be repeated for every one of said real front views, or only one of the lines of items is considered, and only one real front view is acquired.

Then, the method 900 comprises, for the given ESL and corresponding area of the shelf, execution of steps 940 to 960.

At step 940, similar to step 350 of the method of FIG. 3, reference is made to the realogram database P in order to determine which article should be shown in the area which corresponds to slot field (i,j,k). An article identifier $P_{ijk}$ is therefore retrieved from the realogram database P.

Then, at step 950, the central server 2 refers to the article image database A. A preregistered image, associated in the article image database A with the determined article identifier $P_{ijk}$, is retrieved. This image corresponds to an expected front view for the determined article identifier $P_{ijk}$. Said image is typically the image of the front view which is used in a visual representation of the realogram database P, for showing the associations between product slot fields and article identifiers.

At step 960, a similarity rate is calculated between the real front view visible on the acquired image I, and the expected front view retrieved from the article image database A. The purpose of this step 960 is to determine whether the real front view of the article shown in the product slot within the shelves matches the expected front view. In particular, it is possible to detect a situation wherein the article shown in the product slot corresponds to another reference than what is expected in the realogram.

In this manner, discrepancies between the expected arrangement of articles which is planned in the realogram, and the real arrangement of articles in the salespoint, can be detected automatically and easily remedied, as areas of shelves which cause the discrepancies can be traced.

At this step, it is also possible to detect a situation wherein the right article is shown to customers in the determined area, but not with the expected front view. For example, if the front item in the area is not in the right position, the calculated similarity rate with the expected front view is lowered.

In practice, a comparison can be carried out between, on the one hand, pixels of the zone of the acquired image I corresponding to the real front view for product slot field (i,j,k), and on the other hand, pixels of an adapted version of the preregistered image of the expected front view contained in the article database A, re-dimensioned so as to match the dimension of the zone of the acquired image I corresponding to the real front view.

Any other known technique for comparing the images and calculating the similarity rate can be executed at step 960. Especially, it is possible to make use of smarter algorithms than simple pixel comparison, so as to take into account possible changes in luminosity or orientation between the expected front view and the real front view within image I.

Figure 10:
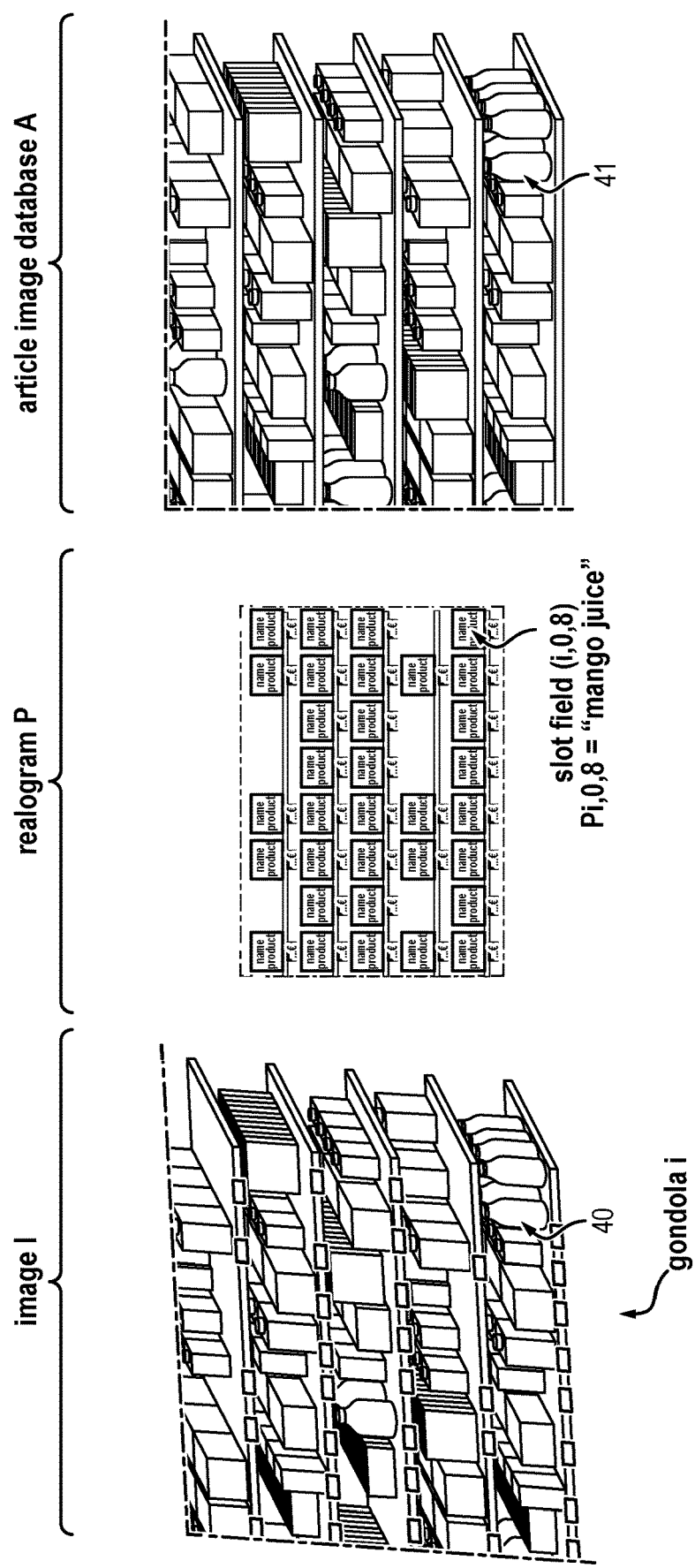
FIG. 10 schematically displays an exemplary representation of a realogram database and an article image database related to shelves of a salespoint.

An example is provided in relation with annexed FIG. 10. The leftmost image I corresponds to part of an acquired image I of a gondola i. A particular article front view 40 is visible on said image: this is the front view for a bottle of mango juice.

It is determined at step 930 that said article front view corresponds to product slot field (i,0,8)—gondola i, first row starting from the lowermost side, and eighth electronic shelf label of said row starting from the leftmost shelf label. In the realogram database P, which is schematically represented by the center image of FIG. 10, the slot field (i,0,8) is indeed associated with an article identifier which itself corresponds with the article reference "mango juice".

Figure 11:
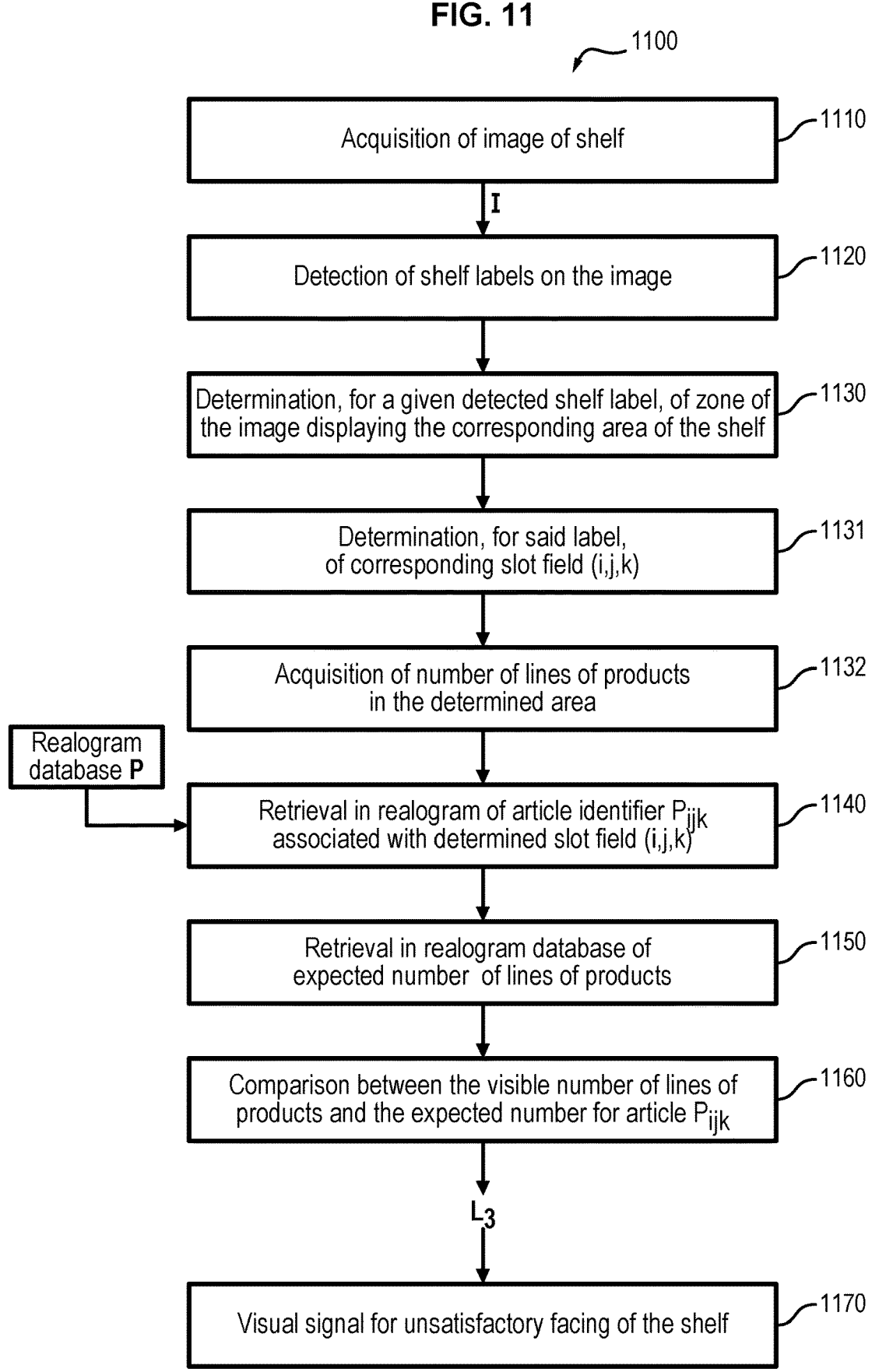
FIG. 11 schematically represents a method for checking article layout according to yet another embodiment, wherein specific facing information (number of lines of products in a particular area of a shelf) is detected and compared to expected facing information.

Other article information can be contained in the realogram database P, such as the prices associated with the articles, or facing information (see description of FIG. 11 below).

The rightmost image is the result of a combination between the realogram database P and the article image database A, amounting to a full visual expected view of gondola i. Indeed, every product slot shown in said visual representation contains the expected front view for the article whose article identifier is registered in the realogram database P in relation with the slot field of said area.

As for the mango juice visible in real front view 40, said front view is determined at step 960 as satisfactory, as an expected front view 41 shown on the rightmost image for slot field (i,0,8) is similar to the article front view 40 of the leftmost image. The expected front view 41 and the real front view 40 may slighty differ by different luminosity conditions and a different angle of view. Said conditions of shooting the image I can be taken into account while calculating the similarity rate between the real front view and the expected front view.

Following completion of steps 940 to 960 for all detected product slots within image I, or alternatively just part of the detected product slots, a list $L_2$ of determined slot fields and/or article identifiers for which the front view provided in the corresponding product slot does not match the expected front view can be output, said list therefore highlighting unsatisfactory product front views.

A predetermined minimal similarity rate can be registered in advance in the central server 2, above which it is considered that the real front view is satisfactory, and the corresponding product slot field and/or article identifier should not be included in the list highlighting unsatisfactory product front view.

The output list of slot fields and/or article identifiers corresponding to unsatisfactory front views can be used at a step 970 of provision of a visual signal for alerting the end user of the detected discrepancies. For instance, the representation visible in the rightmost image of FIG. 10 can comprise highlighted zones, corresponding to the unsatisfactory front views.

Figure 9:
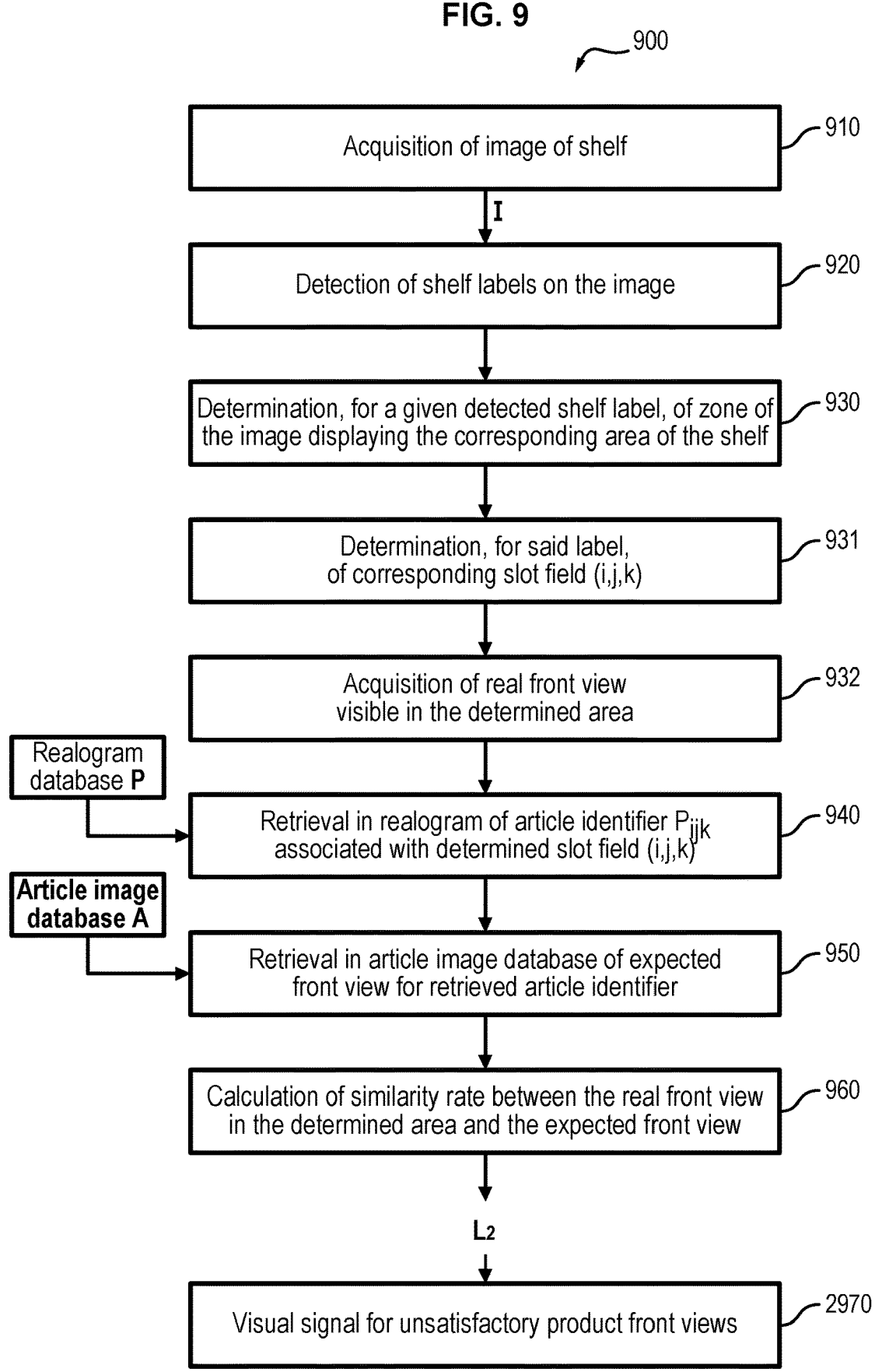
FIG. 9 schematically represents a method for checking article layout according to an alternate embodiment, wherein a real front view visible in a given area of a shelf is compared to an expected front view.

It should be noted that the method for detecting unsatisfactory facings of FIG. 9 is completely independent from the method for detecting empty product slots of FIG. 2. However, the two methods can advantageously be combined. For instance, after detection of the empty areas, a calculation of similarity rate can be executed for a plurality or for all of the remaining product slots. An alert can eventually be sent to the end user, notifying both empty areas (and the corresponding article identifiers) and areas for which the real front view does not match the expected front view.

Alternatively, a calculation of similarity rate between real front view and expected front view can also comprise a determination that the corresponding area of the shelf is empty. In the latter case, the two determinations of whether the area is empty, and whether the article front view is satisfactory, are done jointly.

A third and final embodiment will now be described, in relation with FIG. 11 along with illustrative FIGS. 12 and 13. This embodiment relates to a method 1100 for detection of unsatisfactory article facings inside a shelf, with respect to expected facing information contained in a realogram database P.

In this particular embodiment, the "layout information" is the number of lines of items inside a determined area of the shelf. Alternatively, other kinds of facing information (for instance, the length of the area of the shelf dedicated to a particular product) could be considered.

Similar to the method 900 previously described, for detection of unsatisfactory front views of articles, method 1100 is advantageously carried out for each visible ESL of a shelf, but it can also alternatively be carried out for only one given ESL or a specified set of ESLs.

Steps 1110 to 1131 are by all means similar to steps 910 to 931 of method 900, i.e. ESLs are detected by image recognition and ordered, and for a given ESL, the corresponding area of the shelf is determined and the corresponding slot field (i,j,k) is also determined.

Afterwards, a step 1132 of automated recognition of the number of lines of items visible in the determined area of the shelf is carried out.

In theory, all shown lines of items within the determined area of the shelf should be of the same product—as only one ESL corresponds to the whole determined area. If this is not the case, the method 900 previously described should return a result that one of the real front views is mistaken with respect to information contained in realogram database P. We will assume here that all lines of items inside said area of the shelf are of the same product.

Subsequent step 1140 is similar to step 940 of method 900, with the article identifier $P_{ijk}$ associated in realogram database P to the previously determined slot field (i,j,k) being determined.

Then, at step 1150, the expected number of lines for article $P_{ijk}$ in the determined area of the shelf is retrieved from the realogram database P (or any other database which the server is able to communicate with, associating facing information with article identifiers).

Finally, at step 1160, the retrieved expected number of lines is compared to the real detected number of lines.

Similar to step 970 of method 900, a step 1170 can comprise provision to an end user of a visual signal highlighting zones of the shelves and/or a list $L_3$ of article identifiers and/or a list of slot fields for which the real facing has been found not to match the expected facing.

Figure 12:
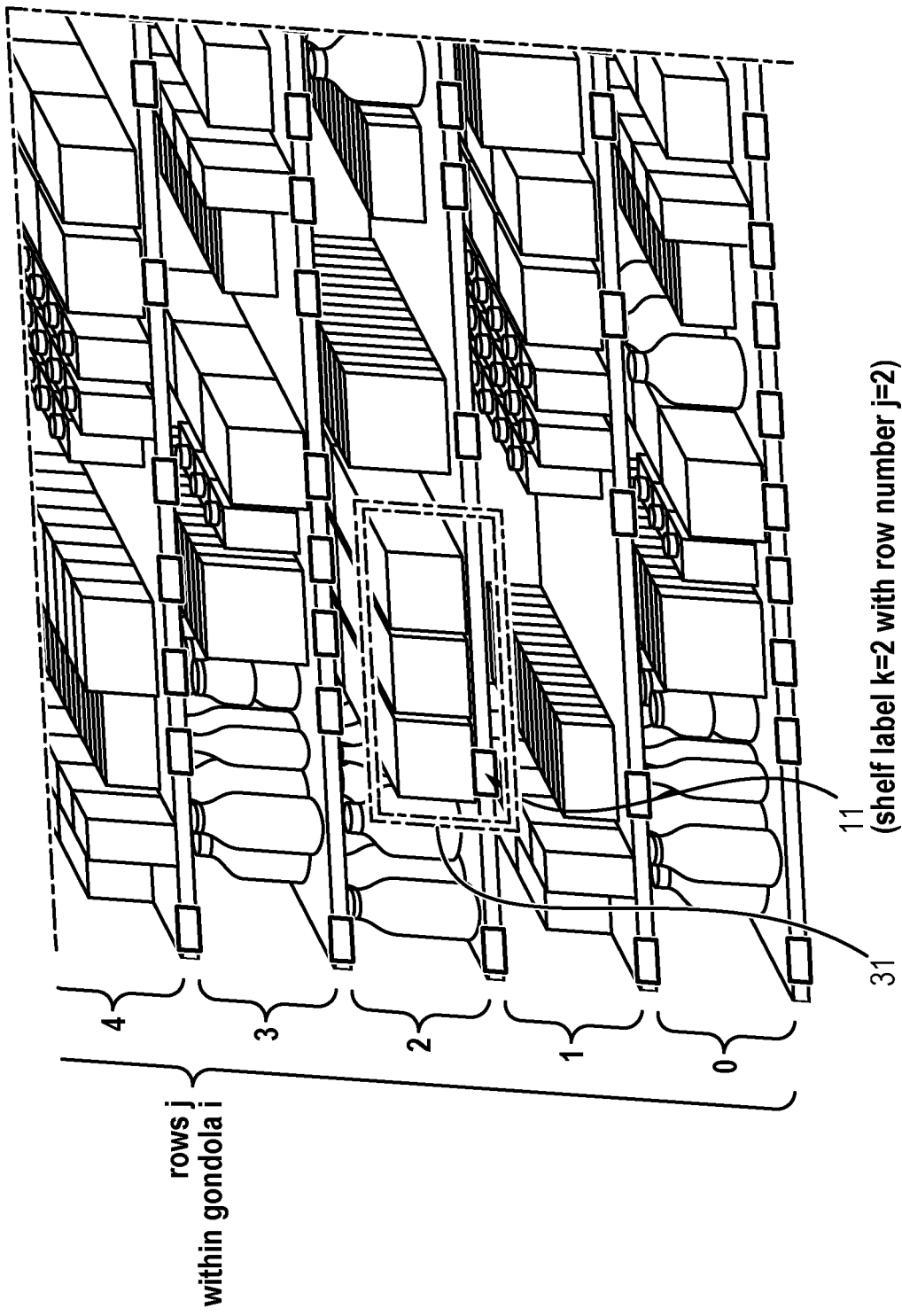
FIG. 12 is a schematic view of a step of acquisition of number of lines of products in a given area of the shelf, as part of the method illustrated in FIG. 11.

An example of operation of said method 1100 for detection of unsatisfactory article facings is provided in the annexed drawings, starting from FIG. 12. In said figure, the same gondola i is considered with respect to the previously described FIGS. 4 to 7. We now consider a different ESL 11. Said ESL is situated in the third row starting from the lower side (j=2) at the second place (k=2). As can be seen in FIG. 12, shelf label 11 corresponds to a plurality of lines of the same product.

When ESL 11 is reached in the course of method 1100, and as a result of step 1132, it is detected that the matching area of the shelf for ESL 11, corresponding to slot field (i,2,2), comprises three lines of products.

Then, at step 1140 and by reference to a realogram database P representing the expected arrangement of articles within the photographed gondola, article identifier $P_{i22}$ is determined.

With reference to FIG. 13, and at step 1150, the server retrieves from realogram database P the expected facing information for slot field (i,2,2), in the form of an expected number of lines of products. In this case, the expected number of lines is 4, which leads to a determination at step 1150 that the real facing does not match the expected facing. The real detected facing information does therefore not comply with the expected facing stored in the realogram database.

The methods 300, 900 and 1100 of the three embodiments described above, even though they have been described separately and independently, can advantageously be combined for detection of a plurality of possible events related to an unsatisfactory article layout. Besides, the man skilled in the art will easily understand that any other kind of layout information readable on an acquired image of a shelf, preferably in an automated manner without human input, can be contemplated as a possible implementation of the present invention.

Besides, any of the methods described above can very advantageously be articulated with a system for determining a performance indicator related to article layout in shelves of a sales area.

For instance, a server involved in one of the previously-described methods can be configured to calculate a satisfaction index for every gondola of a salespoint, or even for every area of the shelves. Such satisfaction index may take into account several possible criteria, in the following order of importance: the presence of an article, whether the present article complies with the expected article reference, whether the real facing complies with the expected facing, whether the shown articles are in a right orientation with respect to an expected layout.

The invention claimed is:

1. A method for checking the layout of articles in a gondola of a sales area, with respect to a realogram database which stores, for each article identified by an article identifier, an expected layout in association with the article identifier and a product slot field unique to an electronic shelf label arranged in the sales area, wherein the product slot field unique to an electronic shelf label arranged in the sales area comprises a gondola number, a row number, and a label number, the method comprising computer-implemented steps of:

acquiring an image of the gondola by an imaging device;

recognizing, by pattern recognition, electronic shelf labels in the acquired image of the gondola;

detecting rows of electronic shelf labels, wherein detecting a row of electronic shelf labels comprises detecting an alignment of recognized electronic shelf labels;

consecutively numbering the detected rows to assign a number to each detected row;

in each detected alignment of recognized electronic shelf labels, consecutively numbering the recognized electronic shelf labels to assign a number to each recognized electronic shelf label;

for a recognized electronic shelf label of a detected row:
determining the product slot field unique to the recognized electronic shelf label by identifying the number assigned to the detected row as the row number of the product slot field and by identifying the number assigned to the recognized electronic shelf label as the label number of the product slot field;

identifying a matching area in the acquired image situated between the recognized electronic shelf label and one consecutive recognized electronic shelf label along the detected rows;

detecting layout information relating to articles in the matching area of the acquired image by image recognition;

identifying, in the realogram database, a stored product slot field matching with the determined product slot field and the article identifier associated with the stored product slot field matching with the determined product slot field; and checking the compliance between the detected layout information and the expected layout stored in the realogram database in association with the identified article identifier;

wherein each electronic shelf label is associated in a labels database with a single article identifier, and, when a given electronic shelf label is associated or re-associated in the labels database with a specific article identifier, the product slot field unique to the given electronic shelf label is also associated or re-associated in the realogram database with the specific article identifier, such that the realogram database is updated in real-time in compliance with the labels database.

2. The method of claim 1, further comprising, after acquiring the image of the gondola, identifying at least one empty area of the gondola in the acquired image by image recognition, wherein for the given electronic shelf label, the layout information detected in the determined area of the gondola is an indication that the area is empty, leading to a determination that the identified article is out-of-stock in the gondola.

3. The method of claim 2, wherein identifying the empty areas of the shelf is carried out by color recognition with respect to a predetermined pattern of the back of the shelf or a row of the shelf.

4. The method of claim 1, further comprising:

retrieving a preregistered image associated in an article image database with the identified article, wherein the preregistered image is an expected front view for the determined article identifier;

calculating a similarity rate between the zone of the acquired image corresponding to the real front view for the matching area of the gondola used to detect layout information and the preregistered image of the expected front view; and outputting a list of determined slot fields and/or a list of article identifiers for which it is determined, from the value of the similarity rate, that the front view is unsatisfactory.

5. The method of claim 1, further comprising:

retrieving in the realogram database of expected facing information for the determined product slot field; and checking, by image recognition, of compliance between the expected facing information and the real facing visible on the acquired image for the matching area of the gondola.

6. The method of claim 5, wherein the expected facing information is a number of consecutive lines of the same article which are to be displayed in the gondola.

7. The method of claim 1, wherein a graphical interface can display to a user a representation of the gondola along with at least one of visual signals highlighting empty areas of the gondola, a visual alert that article identifiers and/or product slot fields associated with detected empty areas of the gondola must be re-stocked, visual signals highlighting areas of the gondola that do not match an expected front view, or visual signals highlighting areas of the gondola that do not match an expected facing.

8. The method of claim 1, wherein detecting electronic shelf labels in the acquired image is carried out by pattern recognition with respect to a predetermined set of possible electronic shelf label shapes.

9. The method of claim 1, wherein, for a given detected electronic shelf label of the acquired image, a zone of the acquired image situated immediately above the electronic shelf label and situated between the electronic shelf label and the consecutive shelf label on the right side is determined as the matching area of the gondola corresponding to the electronic shelf label.

10. A computer program product comprising code instructions for implementing the method according to claim 1, when the code instructions are run on a server of a computer device.

11. A system for checking the layout of articles in a gondola of a sales area, the system comprising:

a plurality of electronic shelf labels arranged on the gondola;

a server which is configured to communicate with a labels database, wherein each electronic shelf label, identified by a unique label identifier, is associated with a single article identifier, the server also being configured to communicate with a realogram database which stores, for each article identified by an article identifier, an expected layout in association with the article identifier and a product slot field unique to an electronic shelf label arranged in the sales area, wherein the product slot field unique to an electronic shelf label arranged in the sales area comprises a gondola number, a row number, and a label number; and an imaging device which is able to acquire an image of the gondola;

wherein the server is further configured to perform the steps of:

recognizing, by pattern recognition, electronic shelf labels in the acquired image of the gondola;

detecting rows of electronic shelf labels, wherein detecting a row of electronic shelf labels comprises detecting an alignment of recognized electronic shelf labels;

consecutively numbering the detected rows to assign a number to each detected row;

in each detected alignment of recognized electronic shelf labels, consecutively numbering the recognized electronic shelf labels to assign a number to each recognized electronic shelf label;

for recognized electronic shelf label of a detected row:

determining the product slot field unique to the recognized electronic shelf label by identifying the number assigned to the detected row as the row number of the product slot field and by identifying the number assigned to the recognized electronic shelf label as the label number of the product slot field;

identifying a matching area in the acquired image situated between the recognized electronic shelf label and one consecutive recognized electronic shelf label along the detected row;

detecting layout information relating to articles in the matching area of the acquired image by image recognition;

identifying, in the realogram database, a stored unique product slot field matching with the determined unique product slot field and the article identifier associated with the stored product slot field matching with the determined unique product slot field; and checking the compliance between the detected layout information and the expected layout stored in the realogram database in association with the identified article identifier;

wherein each electronic shelf label is associated in a labels database with a single article identifier, and, when a given electronic shelf label is associated or re-associated in the labels database with a specific article identifier, the product slot field unique to the given electronic shelf label is also associated or re-associated in the realogram database with the specific article identifier, such that the realogram database is updated in real-time compliance with the labels database.

12. The system of claim 11, wherein the server is further configured to communicate with an article image database, wherein each article identifier is associated with a preregistered image of an expected front view for the identified article, the server being able to compare a zone of an acquired image corresponding to a real front view, the real front view corresponding to detected layout information, with an expected front view.

13. The system of claim 11, wherein the detectable layout information in the acquired image comprises automated recognition of empty areas of the gondola.

14. The system of claim 11, wherein the detectable layout information in the acquired image comprises a real facing visible in an area of the gondola, the server being able to compare the real facing with expected facing information retrieved in the realogram database.

* * * * *